Feb. 27, 1945.  S. HINDS  2,370,466
LIQUID DISPENSING APPARATUS
Filed June 5, 1940 10 Sheets-Sheet 1
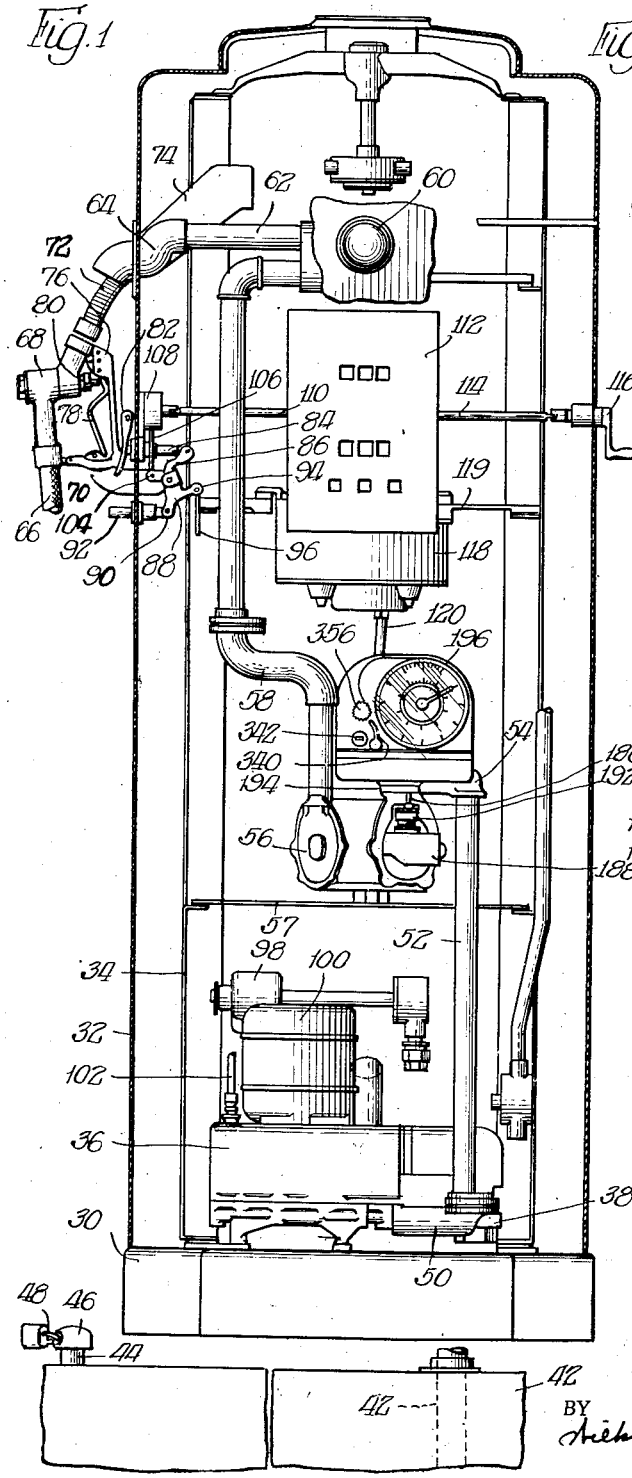
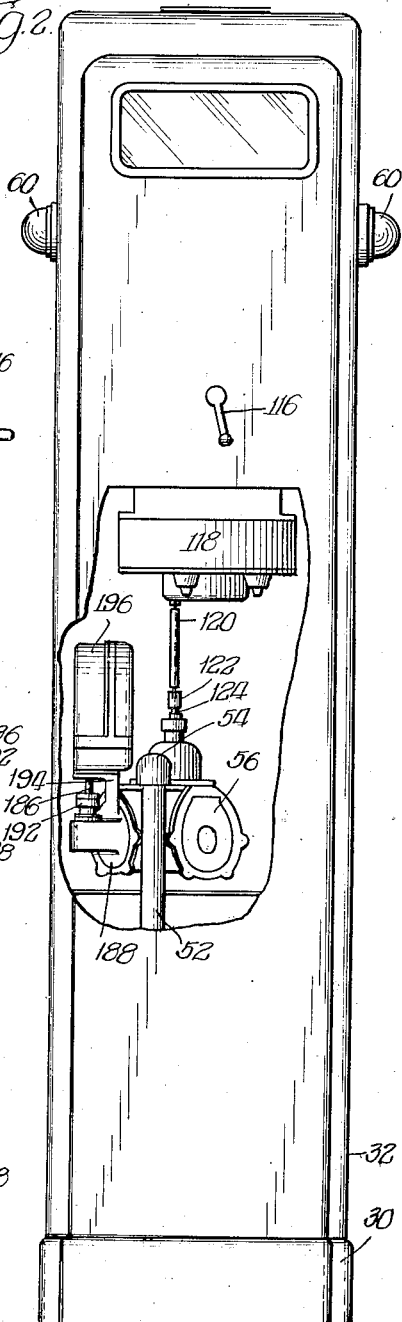
INVENTOR.
Sherwood Hinds,
BY
ATTORNEYS.

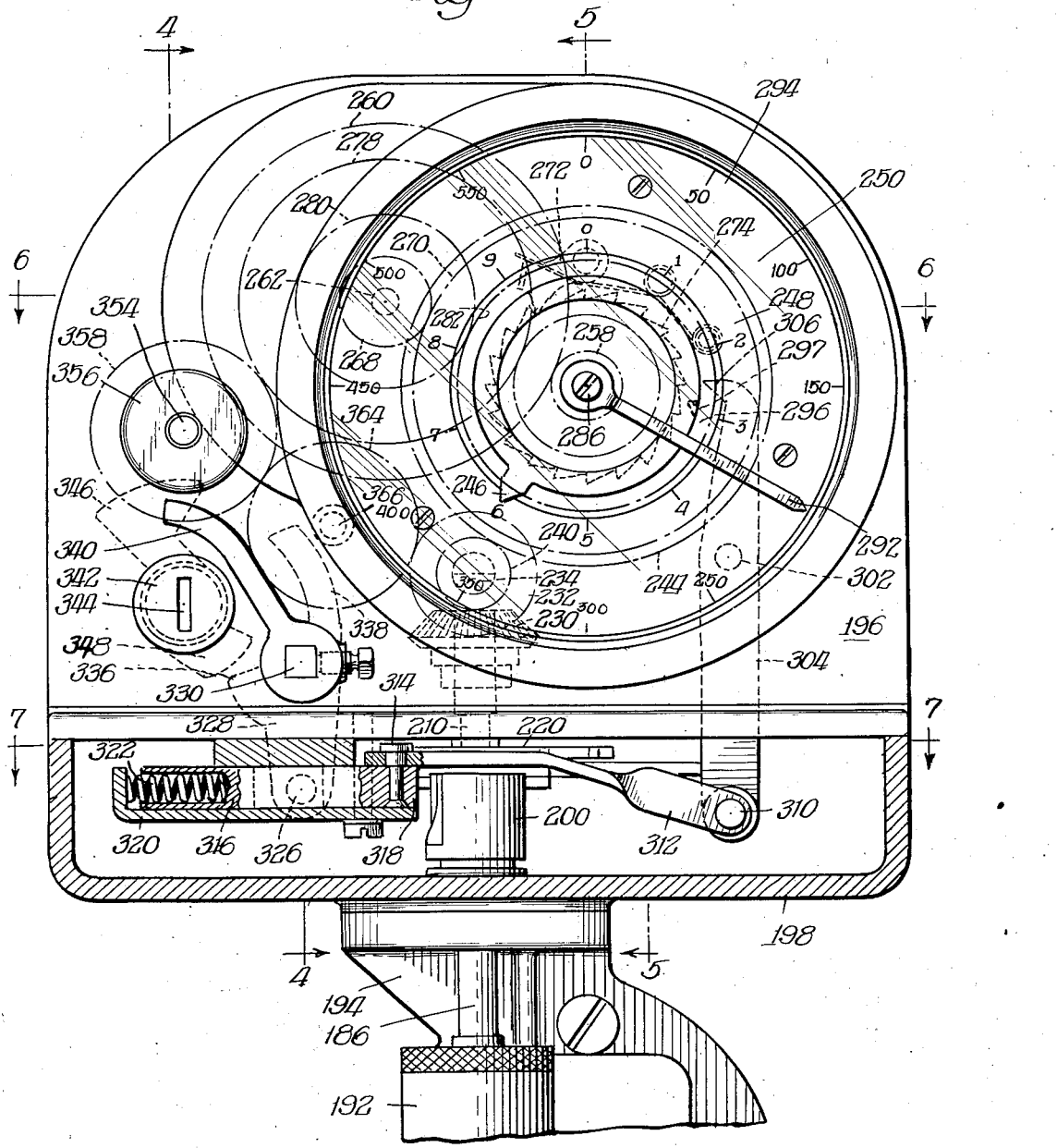

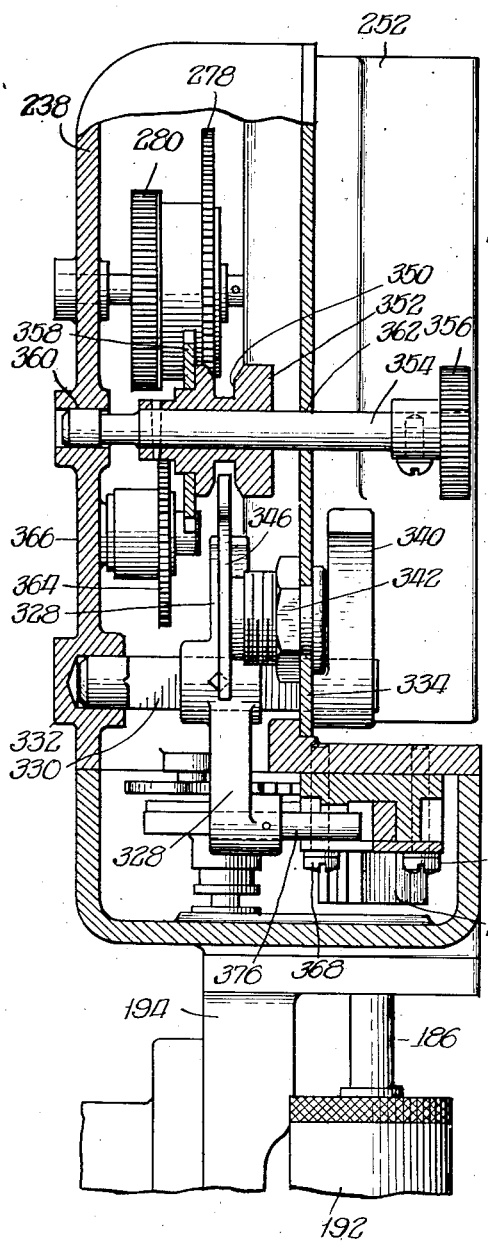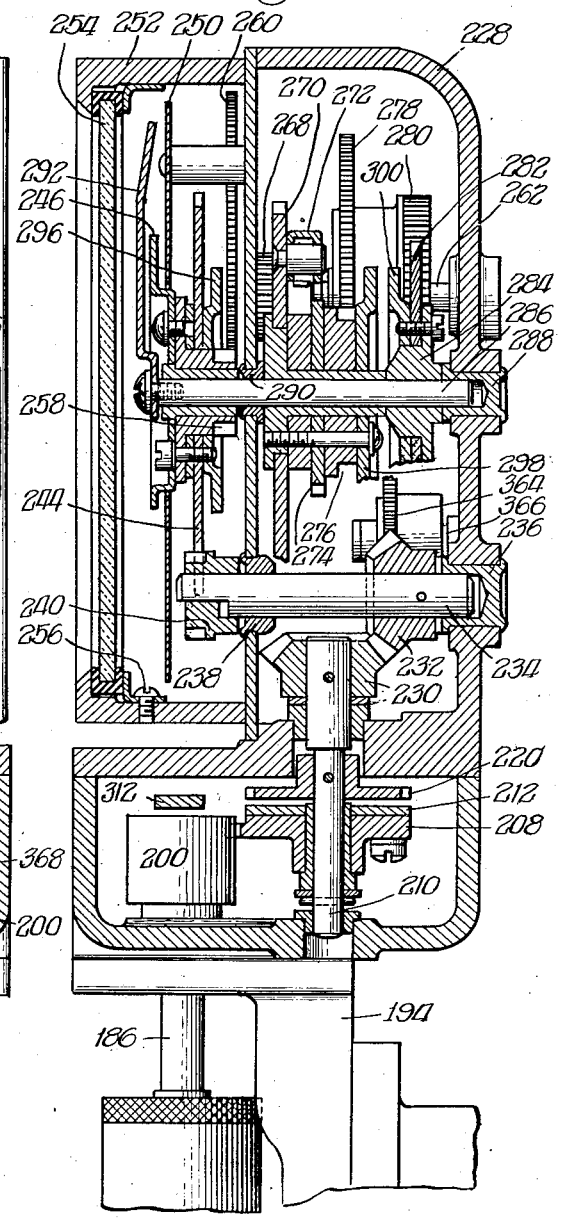

Feb. 27, 1945. S. HINDS 2,370,466
LIQUID DISPENSING APPARATUS
Filed June 5, 1940 10 Sheets-Sheet 4
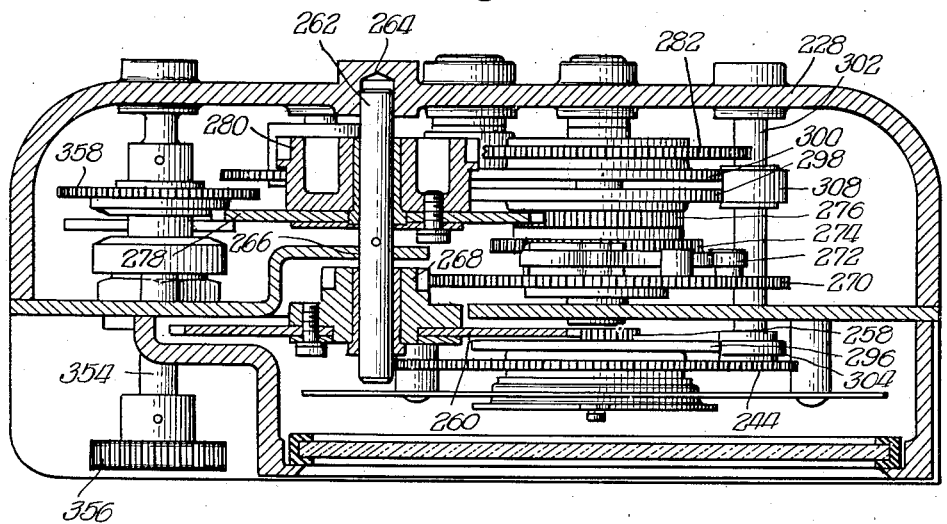
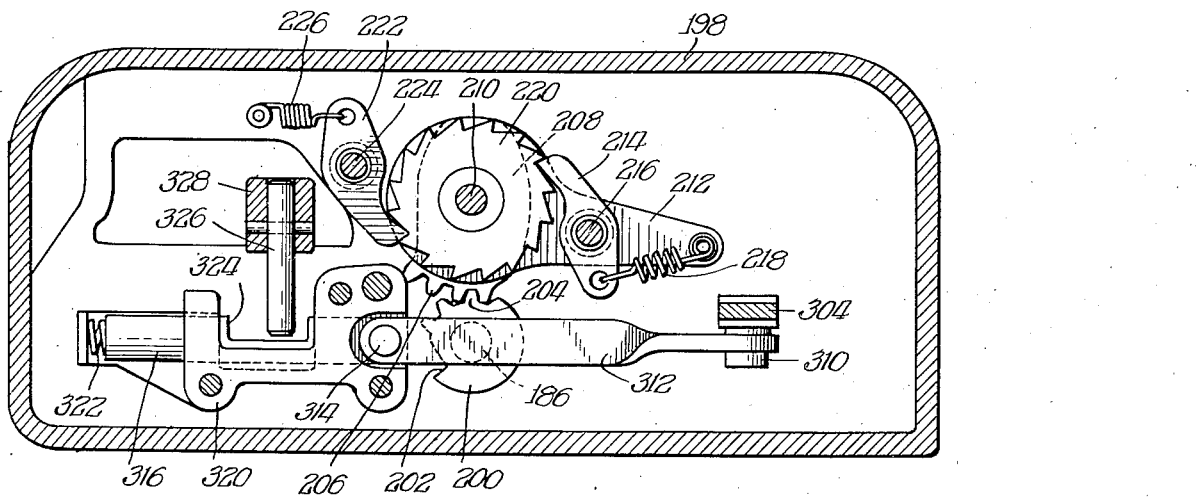
INVENTOR.
Sherwood Hinds,
BY
Wilkinson, Huxley, Byron & Knight
attys.

Feb. 27. 1945.  S. HINDS  2,370,466
LIQUID DISPENSING APPARATUS
Filed June 5, 1940  10 Sheets-Sheet 5

Fig. 8.

INVENTOR.
Sherwood Hinds,
BY
ATTORNEYS.

Feb. 27, 1945.  S. HINDS  2,370,466
LIQUID DISPENSING APPARATUS
Filed June 5, 1940  10 Sheets-Sheet 6
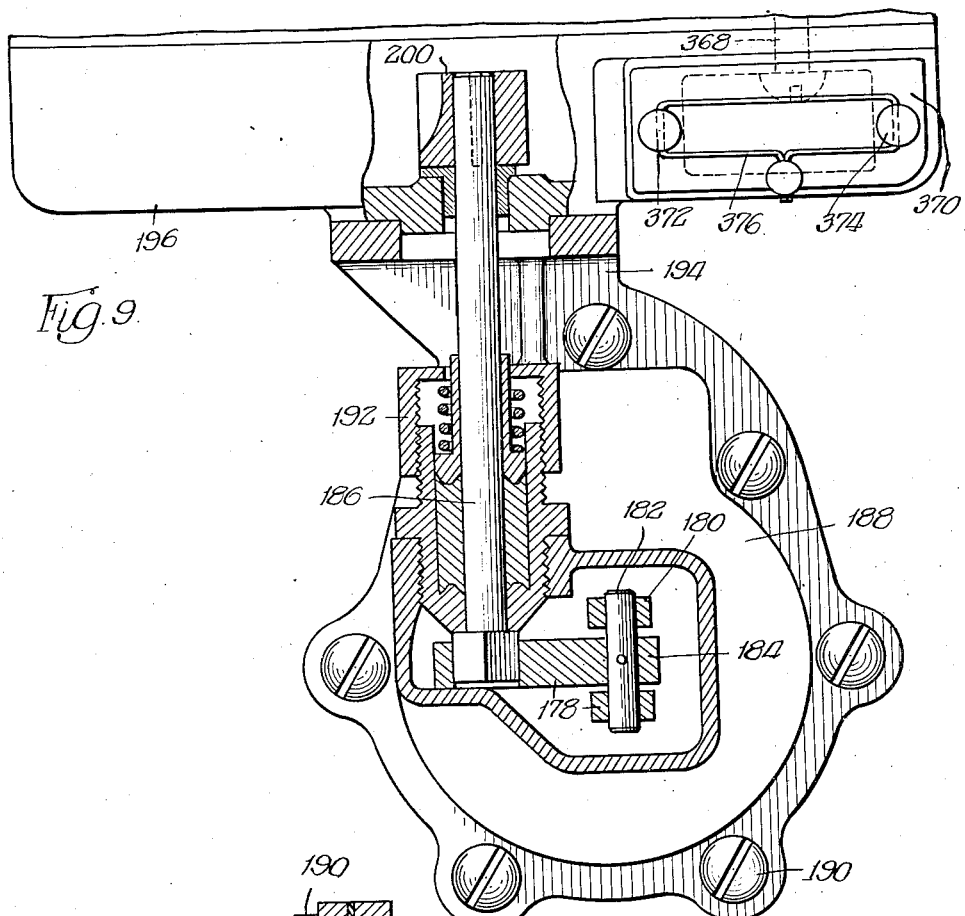
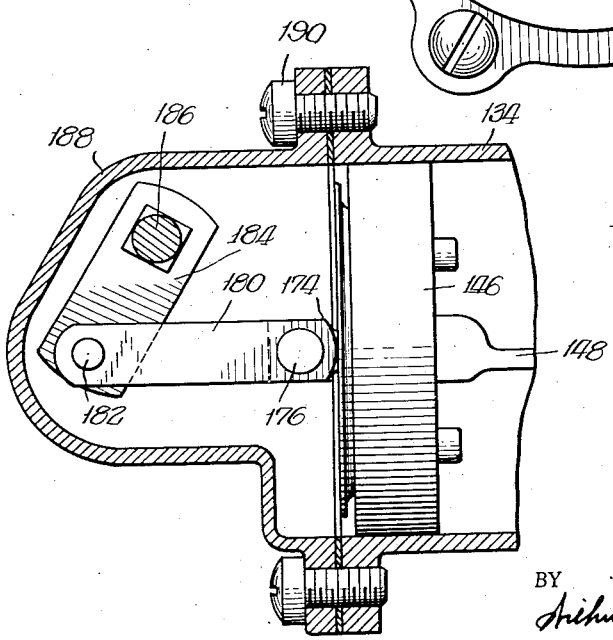
INVENTOR.
Sherwood Hinds,
BY

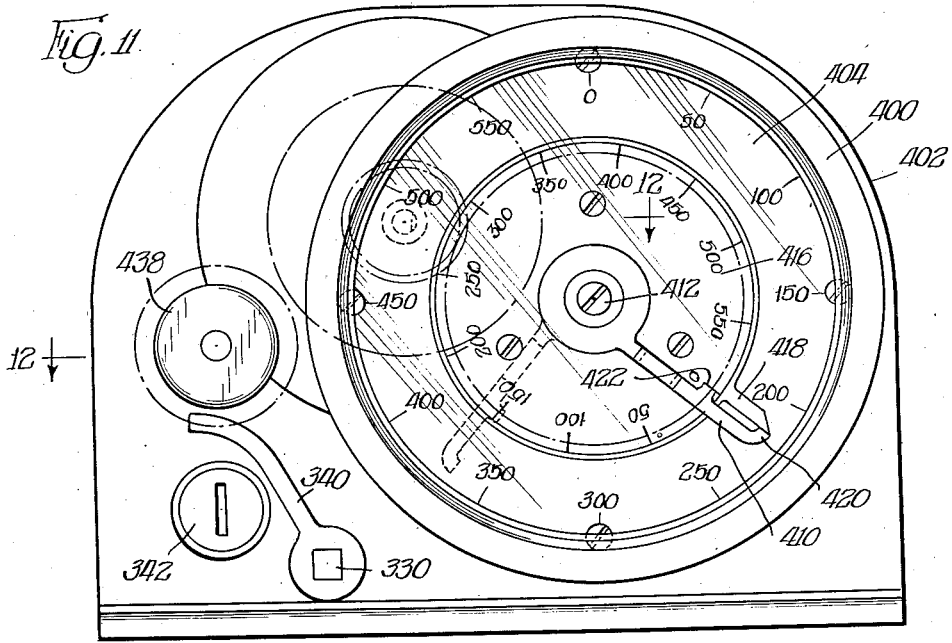
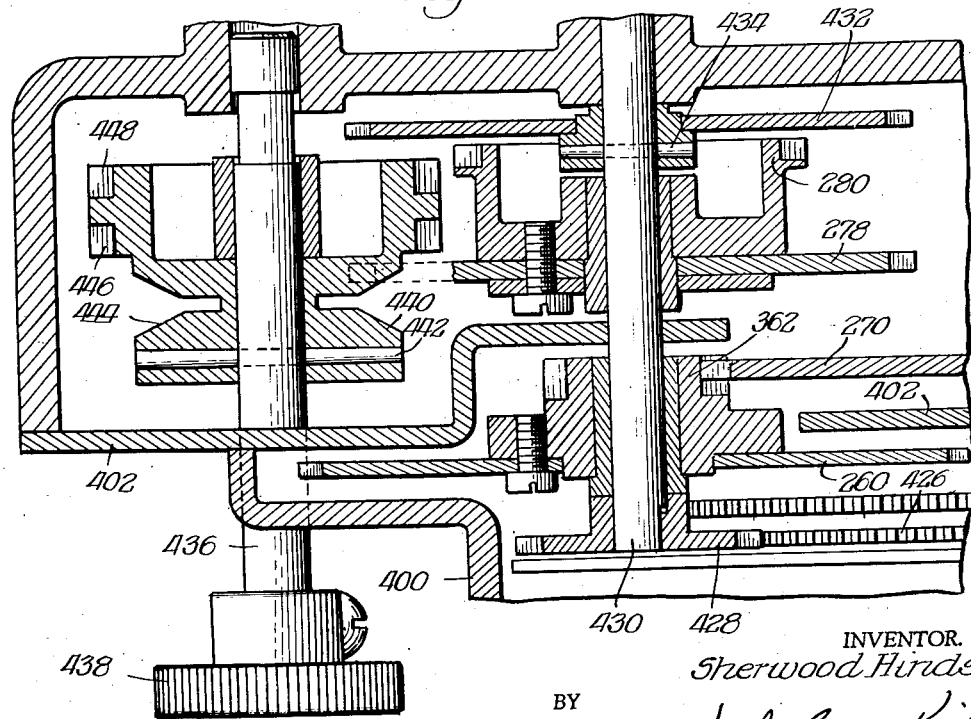

Feb. 27, 1945.    S. HINDS    2,370,466
LIQUID DISPENSING APPARATUS
Filed June 5, 1940    10 Sheets-Sheet 8
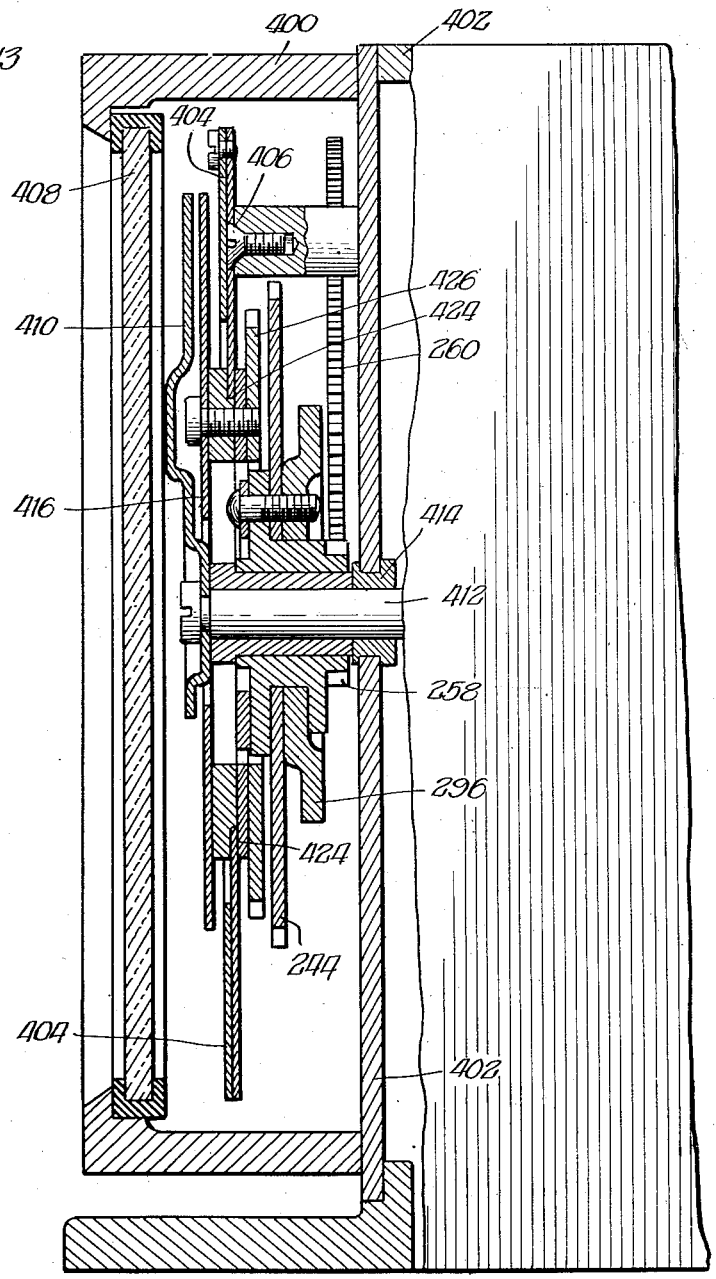
INVENTOR.
Sherwood Hinds,
BY

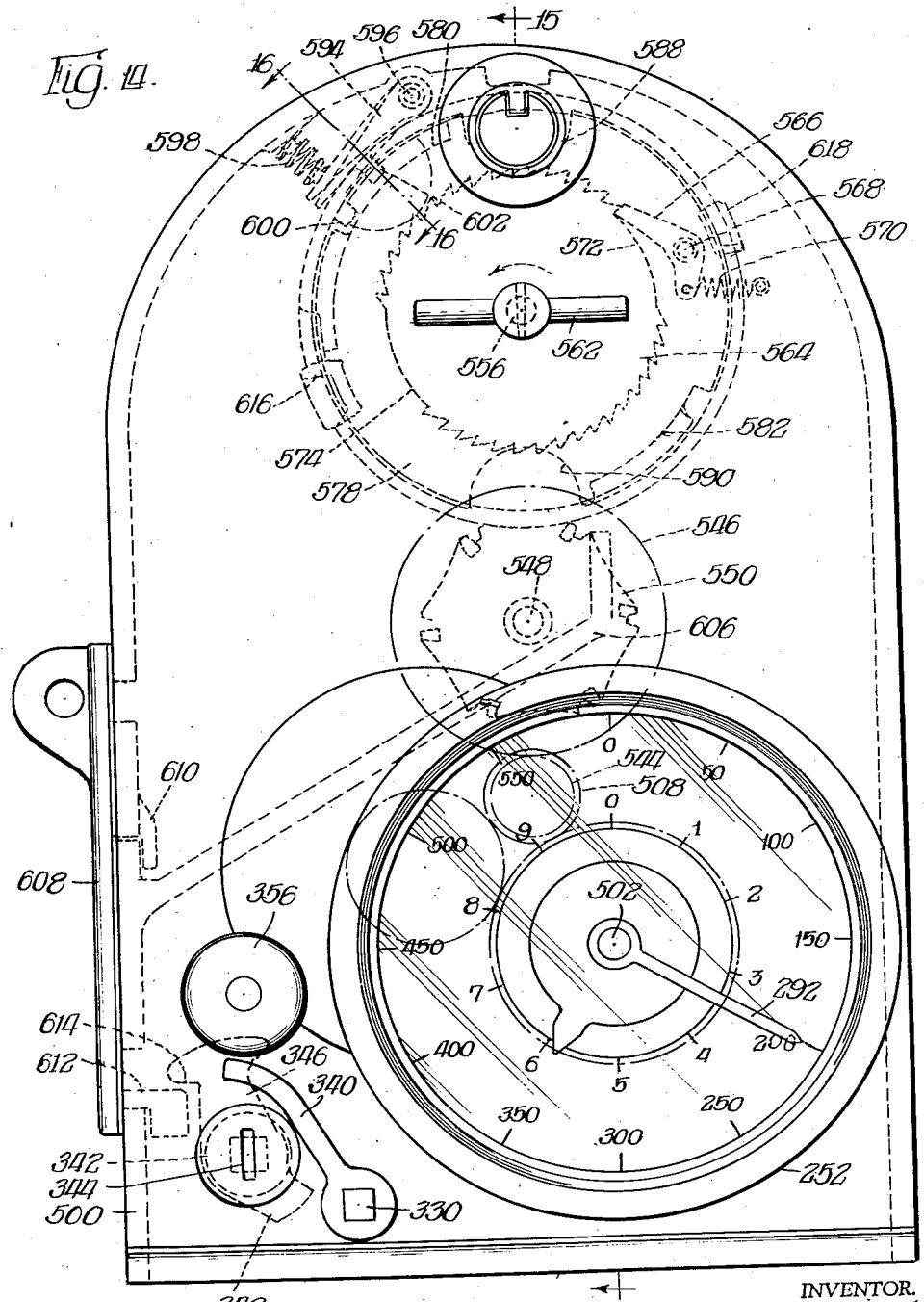

Feb. 27, 1945. S. HINDS 2,370,466
LIQUID DISPENSING APPARATUS
Filed June 5, 1940 10 Sheets-Sheet 10
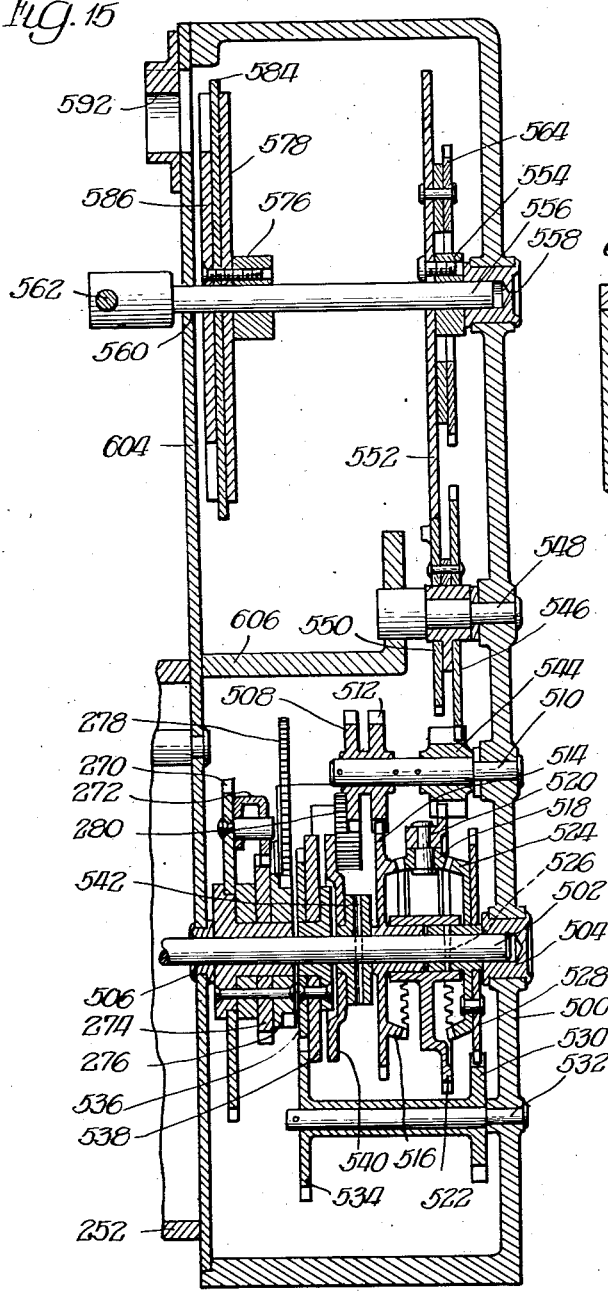
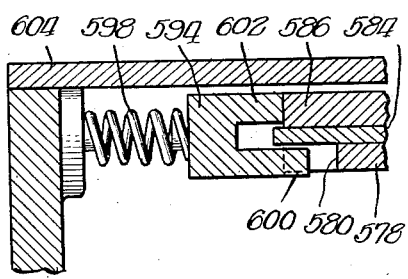
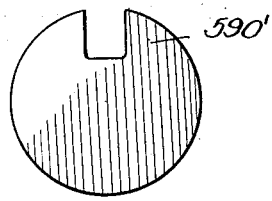
INVENTOR.
Sherwood Hinds, Patented Feb. 27, 1945

2,370,466

UNITED STATES PATENT OFFICE 2,370,466

LIQUID DISPENSING APPARATUS

Sherwood Hinds, Columbia City, Ind., assignor to The Wayne Pump Company, Fort Wayne, Ind., a corporation of Maryland Application April 5, 1940, Serial No. 328,002

16 Claims. (Cl. 194—90)

This invention pertains to indicating and control mechanism for liquid dispensing apparatus.

Service stations now in use for delivering fuel to vehicles include in their equipment liquid dispensing apparatus which are usually of the meter type wherein the meter drives a register which either shows the number of gallons dispensed, or the number of gallons and the cost of the liquid dispensed. These liquid dispensing apparatus are adapted to be connected to sources of liquid supply, such as underground tanks. Many of the service stations are located outside of the metropolitan districts. There are many service stations which are owned by oil companies, or are under contractual obligations to them to dispense their gasoline or fuel. A great many of the stations are operated on close margins so that the owner or operator is not a good credit risk. The owner or operator of a service station may, after a certain length of time, enter into an agreement with another company whereby he dispenses a different brand of fuel. It is the oil companies' business to deliver the fuel to the service station operators, and the fuel is dumped into the said underground tanks. Where an operator is a poor credit risk or dispenses little fuel, the oil company is put to great expense in supplying the operator with fuel.

Ways have been proposed to control this so that an oil company need have its tank trucks make only a predetermined number of regular runs to keep these underground tanks supplied with the proper amount of fuel. Among the ways which have been contemplated is that of providing a coin or token receiving device which controls a shut-off valve in the liquid dispensing apparatus, which device may be supplied with the new pump, or attached to the existing equipment. There are a number of disadvantages to this type of device, one being that the device will be slugged, another being that it makes an unsightly projection on the outside of the liquid dispensing apparatus, and it advertises the fact that the service station operator probably is not a good credit risk. Also, where it is a conversion job, the flow line must be cut in order to apply the control valve. When tokens are used which are peculiar to the oil company, these tokens may be counterfeited, and there is the necessity that the oil company change its bookkeeping system because, as is well known, gasoline and fuel prices vary in different areas. Further, these devices are generally expensive.

It is therefore an object of this invention to provide an inexpensive self-contained unit which may be quickly installed on new or old meters of new or old liquid dispensing apparatus, which device may be set to control the operation of the meter, and therefore there is no need for cutting the dispensing line in the liquid dispensing apparatus in order to install a relatively expensive valve which is also susceptible to leakage.

Another object is to provide a meter controlled device for reducing the delivery cost of the fuel to be dispensed through the liquid dispensing apparatus embodying said meter.

Still another object is to provide a meter controlled device which may be readily installed within the casing of a liquid dispensing apparatus so that there is no unsightly mechanism exposed externally of the casing.

Yet another object is to provide a meter controlled device which is susceptible of application as a conversion unit to existing liquid dispensing apparatus.

A further object is to provide a meter controlled device which can be readily applied or removed from liquid dispensing apparatus in the event the credit rating of the service station owner changes, or in the event he changes the brand of commodity dispensed.

A still further object is to provide a meter controlled device which may be controlled by the oil company, yet which is susceptible of emergency control by the service station operator through the use of a coin or token.

Another further object is to provide a meter controlled mechanism for reducing the number of trips to be taken by the tank truck supplying fuel to a service station, but one which does not necessitate a change in the bookkeeping system of an oil company.

Another object is to provide a meter controlled device wherein the supply tank of the liquid dispensing apparatus need not be filled on each run of the tank truck in an attempt to reduce the number of runs, but only enough need be put into the tank to be taken care of on the regular runs so that it is not necessary to change any inventory methods of an oil company.

Another object is to provide a meter control indicating mechanism which may be readily and accurately set by an authorized person and will show the previous amount available for dispensing.

In this specification the words "coin" and "token" are used synonymously.

With these and various other objects in view, the invention may consist of certain novel features of construction and operation as will be more fully described and particularly pointed out in the specification, drawings and claims appended hereto.

In the drawings, which illustrate embodiments of the device, and wherein like reference characters are used to designate like parts—

Figure 1 is a sectional elevation of a liquid dispensing apparatus having a meter provided with the indicating and control mechanism embodying the invention;

Figure 2 is a side elevation of a liquid dispensing apparatus shown in Figure 1 having a cut away portion to show the meter provided with the indicating and control mechanism embodying the invention;

Figure 3 is an enlarged elevation, partly in section, of the indicating means and a portion of the control mechanism for the meter;

Figure 4 is a sectional elevation taken substantially in the plane as indicated by the line 4—4 of Figure 3;

Figure 5 is a sectional elevation taken substantially in the plane as indicated by the line 5—5 of Figure 3;

Figure 6 is a sectional plan view taken substantially in the plane as indicated by the line 6—6 of Figure 3;

Figure 7 is a sectional plan view taken substantially in the plane as indicated by the line 7—7 of Figure 3;

Figure 8 is an enlarged fragmentary sectional elevation of a displacement meter and the driving connections between the meter and the indicating and control mechanism;

Figure 9 is a sectional elevation taken substantially in the plane as indicated by the line 9—9 of Figure 8;

Figure 10 is a fragmentary sectional elevation showing a connection between the piston of the meter and the control mechanism for the indicating means, the same being taken substantially in the plane as indicated by the line 10—10 of Figure 8;

Figure 11 is an elevation showing a different form of indicating means for the control mechanism for the meter;

Figure 12 is an enlarged sectional plan taken substantially in the plane as indicated by the line 12—12 of Figure 11;

Figure 13 is an enlarged fragmentary sectional elevation of the indicating means illustrated in Figure 11, the same being taken substantially in the plane of the vertical center line of the dials;

Figure 14 is an enlarged elevation through another form of indicating means embodying the invention, the same being adapted for use in conjunction with a coin or token control;

Figure 15 is an enlarged fragmentary sectional elevation taken substantially in the plane as indicated by the line 15—15 of Figure 14;

Figure 16 is an enlarged fragmentary sectional elevation taken substantially in the plane as indicated by the line 16—16 of Figure 14;

Figure 17 is an enlarged plan view of a form of token to be used with the coin control device shown in Figures 14 to 16 inclusive.

Liquid dispensing apparatus

Referring first of all more particularly to the liquid dispensing apparatus illustrated in Figures 1 and 2, said apparatus consists essentially of the base 30 supporting the casing 32, said casing being provided with vertical supporting frame members 34. The pump 36 is supported in said casing, and as shown is of the centrifugal type such as illustrated in Patent No. 2,124,681, granted July 26, 1938, said pump being provided with the inlet 38 connected through the pipe 40 to the source of supply 42. The source of supply is provided with the fill opening 44 provided with the fill cap 46, said fill cap being provided with the lock 48. The pump 36 is also provided with the outlet 50 connected through the pipe 52 to the inlet 54 of the meter 56, the meter being of the displacement type and in principle conforming to the construction such as illustrated in Patent No. 1,893,429, of McGogy, granted January 3, 1933 or Patent No. 2,144,748, Arnold et al., granted January 24, 1939 said meter being supported by the frame members 34 as at 57.

The outlet side of the meter is connected through the pipe 58 to the visible liquid flow gauge or visi-gauge 60, the liquid passing through the visi-gauge 60 to the pipe 62 and thence through a suitable connection 64 to the hose 66. The hose 66 is provided with the nozzle 68 shown in inoperative supported position on the fixed hose support 70, in which position the end 72 of the nozzle extends into the boot 74. The nozzle is provided with the nozzle guard 76 to which the operating lever 78 for the control valve 80 is pivoted. When the nozzle is in supported position it contacts the pivoted lever 82 which overlies the push button 84 maintaining it in innermost position, said push button being disposed above the fixed support 70. The inner end of the push button 84 contacts one arm 86 of the pivoted bell crank 88. The lower arm 90 of said bell crank is connected to, or abuts, the push button 92 disposed below the fixed support 70. The bell crank 88 is provided with another arm 94 connected to the switch operating rod 96 which extends downwardly and is connected to the motor control switch 98 for controlling operation of the motor 100. The motor 100 is suitably connected to the impeller of the pump 36, all as shown and described in said Patent No. 2,124,681, and the pump is provided with the vent 102 from the air separating means, which vent extends to a high point in the casing. The bell crank 88 is also provided with the arm 104 suitably connected as at 106 to the interlock 108, said interlock being connected through the shaft 110 to the registering means 112. Said registering means is connected through the shaft 114 to the reset crank 116.

In the embodiment shown, the registering means 112 is provided with the variator 118 so that the computing head formed by the variator and registering means is of such character that it indicates the price of the liquid dispensed, the amount of the liquid dispensed, and the posted or prevailing price of the liquid dispensed, said computing head being supported by the frame members 34 as at 119. The interlock is so arranged that, having once served a quantity of liquid and thereafter opened the motor switch, it is necessary to reset the register to zero by rotating the crank 116 before additional liquid can be served. The variator and register are connected through the meter shaft 120 to the coupling 122 of the meter drive shaft 124.

Meter control mechanism—Figures 3 to 10, inclusive

Referring now more particularly to Figures 3 to 10, inclusive, the meter shaft 124 extends through the stuffing box 126 and is provided with the yoke 130 disposed within the valve dome 132 of the meter casing 134 of the meter 56. The yoke 130 is adapted to be rotated by the rotating valve 136 disposed on the valve seat 138, the valve seat being suitably ported to supply liquid from the dome through the passages 140 and 142 to the respective ends of the cylinders, one of which is illustrated at 144. The meter shown is of the four cylinder type, and it is understood that similar passages are provided for the other opposed pair of cylinders. When one piston is moving in one direction, say, toward the right as viewed in Figure 8, liquid is supplied to the end of the cylinder 144 to move the piston 146 toward the right, said piston being connected through the piston rod 148 to the opposite piston, indicated generally at 150, which piston is forcing liquid from the end of its cylinder through the passage 142 to the discharge passage 152 through which it passes to the pipe 58. When the pistons are moving in the opposite direction, liquid passes through the passage 140 through the passage 152 to be discharged.

Rotation of the valve of course controls the direction of the flow of liquid. The valve is rotated through the shaft 154 connected to said valve, the lower end of the shaft being provided with the crank 156 connected through the antifriction bearings 158 to the piston rod 148 of the cylinders 146 and 150, and through the piston rod 159 to the other pairs of cylinders. The piston 146 consists essentially of the disk 160 to which the leathers 164 are connected as at 166. A spring 168 is provided disposed in the retainers 170, and normally urging the leathers toward the cylinder walls.

The piston rod 148 is connected as at 172 to the connecting rod 174, said connecting rod being pivoted as at 176 to the links 178 and 180, said links being pivoted as at 182 to the crank arm 184. The crank arm 184 is fixed to the upwardly extending shaft 186. It will be seen that the end of the cylinder is closed by the housing 188 secured as at 190 to the meter casing 134, the shaft 186 passing through the stuffing box 192 provided on the housing. The housing is also provided with the bracket support 194 providing supporting means for the indicating and control mechanism indicated generally at 196. The shaft 186 extends into the casing 196 of the control mechanism, and is provided with the multilated gear 200. The gear 200 is provided with the locking shoulder 202 and gear teeth 204 meshing with the teeth 206 of the mutilated gear 208 rotatably mounted on the shaft 210. The ratio of the gears 200 and 208 is one to two, so that oscillation of the shaft 186 through approximately 60° causes oscillation of the gear 208, and consequently of the shaft 210 on which said gear is mounted, through an arc of approximately 30°.

The pawl carrier 212 is secured to the gear 208, and the pawl 214 is pivoted to said carrier at 216, being urged in a counterclockwise direction as viewed in Figure 7 by the spring 218. The pawl 214 is adapted to have cooperative engagement with the ratchet 220 non-rotatably mounted on the shaft 210, and reverse movement of the ratchet 220 is prevented by means of the stationary pawl 222 pivoted to the casing 198 as at 224, being urged toward said ratchet by means of the spring 226. The ratchet 220 is provided with sixteen teeth, each tooth representing approximately 22½°. The excess movement of the pawl 214 is merely lost motion. Thus one oscillation results from the passage of one pint of liquid through the meter. It thus takes sixteen oscillations, or two gallons, to cause the ratchet 220, and consequently the shaft 210, to make one complete revolution.

The shaft 210 extends within the indicating mechanism casing 228 and is provided with the miter gear 230 non-rotatably mounted thereon, said miter gear driving the miter gear 232 non-rotatably mounted on the shaft 234 journalled as at 236 and at 238 within the casing 228. The shaft 234 is provided with the gear 240 which meshes with the gear 244, the ratio of the gears 240 to 244 being one to five. Thus the gear 244 and the parts attached thereto make one complete turn for every ten gallons. The gear 244 is provided with the pointer 246, and this pointer coincides with the small scale 248 numbered from zero to nine, inclusive, and provided on the dial 250 disposed in the dial casing 252 supported on the casing 228, the dial casing being closed by means of the glass or other transparent covering 254 secured therein as at 256. The gear 258 is also secured to the gear 244 and meshes with the gear 260 rotatably mounted on the shaft 262, said shaft being journaled as at 264 and 266 in the casing 228. The gear 260 is attached to the gear 268, which in turn meshes with the gear 270. The gear 270 is provided with the pawl 272 which is adapted to drive the twenty-tooth ratchet 274, each tooth corresponding to ten gallons.

The ratchet 274 is provided with the gear 276, which in turn meshes with the gear 278, which in turn is attached to the gear 280, and the gear 280 meshes with the gear 282. The gear 282 is rigidly secured to the hub 284 secured to the shaft 286, and the gears 244, 258, 270 and 274, and the pointer 246 are rotatably mounted with respect to said shaft 286. The shaft 286 is journaled as at 288 and 290 in the casing 228, and the outer end of the shaft 286 is provided with the pointer 292 which is adapted to be moved by said shaft 286 over the outer scale 294 of the dial 250. The graduations on the outer scale are from "0" to "250," and the train of gears 258, 260, 268, 270, 276, 278, 280 and 282, and the pawl and ratchet 272 and 274 will carry an overall ratio of from sixty to one. Attached to the gear 244, and consequently to the pointer 246, is the disk 296 which carries the notch 297, and rigidly attached to the gear 276 is another disk 298 of the same size as said first named disk, and another similar disk 300 is rigidly secured to the gear 282. The disks 298 and 300 are also provided with notches corresponding to the notch 297, and are so disposed that when the pointers 246 and 292 are in alignment at the zero graduations, the notches 297 are in alignment.

A shaft 302 is journaled in the casing 228 and is provided with a pawl 304 fixed thereto, the tooth 306 of said pawl being adapted to be received in the notch 297 of the disk 296 when the pointer 246 is at zero, and secured to said shaft is a double pawl 308 similar to the pawl 304 having a tooth adapted to be received in the corresponding notches 297 in the disks 298 and 300 when the pointer 292 is in zero position. The lower end of the pawl 304 is pivotally connected as at 310 to the link 312, the other end of the link being pivotally connected as at 314 to the locking block 316 adjacent the latch end 318 of said block, said block being slidably mounted in the housing 320 and being urged toward the right as viewed in Figures 3 and 7 by means of the spring 322. Said block 316 is provided with the cut out portion or notch 324 disposed to receive the pin 326 provided on the lever 328, said lever being fixedly mounted on the shaft 330 journaled as at 332 and 334 in the housing 228. The lever 328 is provided with the locking shoulder 336, and is also provided with the upwardly extending arcuate arm 338. The outer end of the shaft 330 is provided with the control lever 340 adapted to be moved to rotate the shaft 330.

The lock 342 is provided, said lock as shown having a suitable keyway 344 adapted to receive a suitable key which may be turned to control movement of the upper and lower cams 346 and 348. The lower cam 348, in locked position, is disposed in way of movement of the shoulder 336 to prevent rotation of the lever 340 in a clockwise direction. The upper cam 346, when the lock is in locked position, extends within the slot or groove 350 of the collar 352 non-rotatably provided on the setting shaft 354. The setting shaft 354 extends outwardly of the casing 228 and is provided with the setting knob 356. The collar 352 is non-rotatably provided with the setting gear 358, and the shaft 354 is journaled for sliding movement in the housing 228 as at 360 and 362. Movement of the shaft 354 toward the left as viewed in Figure 4 moves the gear 358 to a position to mesh with the idler 364 pivoted to the casing as at 366. Said idler meshes directly with the miter gear 232 and, by moving the shaft 354 in a direction, i. e., toward the right as viewed in Figure 4, the gear 358 may be moved to mesh with the gear 278.

*Operation—Figures 3 to 10 inclusive*

In operation of this form of the device, assuming that the pointers 292 and 246 are in zero position and it is desired to condition the liquid dispensing apparatus so that gasoline or other liquid may be dispensed therefrom, an authorized person having the key for the lock 342 can insert the key in the keyway 344 and turn the key in a clockwise direction through ninety degrees. Movement of the key will cause the cams 346 and 348 to be moved through an arc of ninety degrees, which will remove the cam 346 from the slot 350 of the collar 352. In moving the cams, the cam 348 will be moved out of the path of the shoulder 336 and, in order to complete the full 90° movement of the cam 346, the lever 340 must be moved in a clockwise direction to move the arm 338 out of the path of the cam 346. Movement of the lever 340 in a clockwise direction causes the pin 326 to move the block 316 against the spring 322, withdrawing the latching edge 318 of the block out of the path of the shoulder 202, and moving the pawls 304 and 308 to a position permitting free movement of the disks 296, 298 and 300. The knob 356 can then be moved inwardly or outwardly to engage the selected gears 364 and 278 for rotating said gears and consequently the pointers 292 and 246 to the desired positions which, in the embodiment shown in Figure 3, is at 206 gallons.

If the knob is pulled toward the right as shown in Figure 4, movement of the knob 356 may be made to move the pointer 292 to the selected position, because the gear 358 will be moved to mesh with the gear 278. Movement of the gear 278 will cause the gear 280 to move the gear 282 fastened to the shaft 286. After the knob 356 is pushed toward the left as viewed in Figure 4 to mesh the gears 358 and 364, the knob may be turned and the pointer 246 can be moved to any division on the inner scale because the pawls 222 and 214 with ratchet 220 act as an overrunning clutch to permit the pointer to be moved independently of the driving means or shaft 210. Thus movement of the gear 364 causes movement of the gear 232 and the shaft 234 in turn moving the pointer 246 through the gears 240 and 244.

After the dial has been set to the desired amount, the hand lever 340 is moved in a counterclockwise direction to permit the upper cam 346 to be positioned within the slot 350 whereby the reset knob 356 is disconnected from both pointers. The key can then be removed from the lock and unauthorized setting of the indicator cannot be effected. Liquid can then be dispensed from the liquid dispensing apparatus in the usual way. That is, the nozzle 68 is removed from the hook 70. The lower button 92 is depressed, causing the bell crank 88 to close the switch 98, rendering the motor 100 operative. Liquid is then drawn from the tank 42 through the pump 36 and passes upwardly through the pipe 52 and through the meter 56, where it is measured, the register 112 showing the amount dispensed and the cost of said liquid dispensed at the prevailing rate.

The liquid passes out of the pipe 58 through the visi-gauge 60, the pipe 62 and through the hose, it being assumed that the nozzle valve 80 is opened by the lever 78. Liquid passing through the meter causes the piston 146 to reciprocate in the cylinder 144. Reciprocation of the piston causes oscillation of the crank 184, which in turn oscillates the shaft 186.

Oscillation of the shaft 186 causes the gear 200 to oscillate, which in turn oscillates the gear 208. Oscillation of the gear 208 causes rotation of the shaft 210 through the pawl and ratchet 214 and 220 and causes rotation of the miter gears 230 and 232 and the shaft 234. Rotation of the shaft 234 causes rotation of the hand 246 through the gear 244 in a subtracting direction. Rotation of the pointer 246 in a subtracting direction also causes rotation of the gear 258, which in turn causes rotation of the gear 260. The gear 260 is mounted on the shaft 262, and rotation of the gear 260 causes rotation of the gear 268, which in turn rotates the gear 270. The gear 270 causes the pawl 272 to rotate the ratchet 274 in a subtracting direction which in turn causes rotation of the gear 276. Rotation of the gear 276 rotates the gear 278, in turn rotating the gears 280 and 282. Rotation of the gear 282 causes rotation of the shaft 286 and consequently the pointer 292 in a subtracting direction.

When the hands 246 and 292 reach the zero position, the pawls 304 and 308 are in a position to be received in the notches 297 in the disks 296, 298 and 300, arresting movement of the hands. When the pawls drop into said notches, the link 312 is moved toward the right as viewed in Figure 3, causing the locking edge 318 of the block 316 to engage the shoulder 202 to lock the shaft 186, and consequently to lock the pistons of the meter, rendering the meter inoperative whereby no liquid can pass through the meter, and the liquid dispensing apparatus consequently is rendered inoperative. It is then necessary for an authorized person to reset the indicator to release the meter.

In the event it is desired to render the meter control device inoperative, it is only necessary to turn the key in the lock 342 throgh 90°, pushing the hand lever 340 in a clockwise direction, thus pulling the block 316 to a position where the locking shoulder 318 disengages the shoulder 202. By removing the key in this unlocked position, the pin 326 will prevent the block 316 from moving to a position to engage the gear 200.

In assembling the indicator control device, it is seen that the casing 196 is secured to the casing 198 by means of screws indicated generally at 368, one of said screws as shown in Figure 9 being disposed behind the cover plate 370, the cover plate being retained in position by means of the screws 372 and 374. Unauthorized access through the cover plate is prevented by means of the seal 376 whereby improper manipulation by means of disassembling the device is prevented, and therefore it is impossible to change the setting of the dial hands or indicators in any manner except the correct procedure, without breaking the seal. As already pointed out, the pointers are assembled behind the glass 354 as illustrated in Figure 5, to prevent them from being directly improperly manipulated.

*Meter control mechanism—Figures 11, 12 and 13*

In the modification of the indicator mechanism illustrated in Figures 11, 12 and 13, there is shown a form of mechanism wherein a main and secondary dial modification is used which permits the ready setting of the main indicator mechanism to an additional amount, but permits the secondary indicator mechanism to show the previous setting of the main indicator mechanism, and also permits the main indicator mechanism to be set, using the secondary indicator mechanism as a zero indicator for the additional setting. In this form of mechanism, the indicator casing 400 supported on the casing 402 is provided with the main dial 404 graduated from zero to 550 gallons, said dial being fixed within the casing 400 as at 406, the casing being closed as by means of the glass 408. The pointer 410 (corresponding to the pointer 292) is mounted on the shaft 412 (corresponding to the shaft 286), said shaft being journaled in the casing 402 as at 414.

The inner movable dial 416 is likewise graduated from zero to 550 gallons, and is provided with the pointer 418 fixed thereto, said pointer preferably being flat on one edge to more readily be aligned with the spaced indices 420 and 422 of the pointer 410. The index 420 is adapted to coincide with the pointer 418 to indicate the same reading, and the index 422 is adapted to be read against the numerals of the dial 416, it being seen that when the pointer 418 and the index 420 are aligned, the index 422 indicates zero on the dial 416. The dial 416 is rotatably mounted on the dial 404 as by the track 424, and the dial 416 is provided with the gear 426 meshing with the gear 428 (Figure 12). The gear 428 is non-rotatably mounted on the shaft 430 (corresponding to the shaft 262), and as before, the gear 260 is rotatably mounted on the shaft 430, said gear being provided with the gear 268 meshing with the gear 270. The gear 278 is also rotatably mounted on said shaft 430, said gear being provided with the gear 280 meshing with the gear 282 (Figure 6) fixed to the shaft 412. The shaft 430 is also provided with the gear 432 fixedly pinned thereto as at 434. The slidable and rotatable setting shaft 436 (corresponding to the shaft 354) is provided with the setting knob 438 and extends inwardly of the casing 402 being provided with the collar 440 corresponding to the collar 352. Said collar is pinned to the shaft 436 as at 442 and is provided with the slot 444 (corresponding to the slot 350) for the reception of the cam 346 provided on the shaft 330 controlled by the lever 340 and the lock 342. The collar 440 is also provided with the gears 446 and 448 adapted to selectively mesh with the gears 278 and 432 during authorized setting of the device.

*Operation*

In the operation of this form of the device it will be understood that the pointer 410 is driven in exactly the same manner as already described with respect to the pointer 292, but, as pointed out, the pointer 410 is provided with two indices, the index 420 indicating the number of gallons which the purchaser still has coming from any prior setting. As shown in Figure 11, this amounts to approximately 217 gallons. At the time a new purchase is made, the pointer 418, and consequently the zero indication of the dial 416, is brought in conjunction with the indices 420 and 422 of the pointer 410. This then gives the zero point for any additional filling as it may be read on the dial 416 by the index 422. The dial 416 can be moved or set in any position by proper unlocking of the device at the lock 342 as already described, moving the handle 340, permitting the knob 438 to be moved inwardly toward the casing, that is, upwardly as viewed in Figure 12, causing the gear teeth 448 to mesh with the gear 432. Thus rotation of the knob 438 causes the shaft 436 to rotate the gear 448, the gear 432, the shaft 430, the gears 428 and 426, thus rotating the dial 416. After the indicators 418 and 410 are aligned as above pointed out, the knob 438 can then be pulled outwardly to cause the gear 446 to set the indicator or pointer 410 in the manner described with respect to the indicator 292, that is, rotation of the shaft 436 rotates the gears 446 and 278 causing the gear 280 to rotate the gear 282, and consequently to rotate the shaft 412 and the pointer 410. The device can then be locked so that the indicators cannot be tampered with, and the device will indicate through the indicator 418 the number of gallons to which it had been set prior to the new sale, and, through the indicator 410, the total number of gallons for which the device is set. Operation of the liquid dispensing apparatus then operates the indicator 410 in the manner described with respect to the indicator 292 to permit the set number of gallons to be dispensed.

*Meter control mechanism—Figures 14 to 17 inclusive*

In the form of the device illustrated in Figures 14 to 17 inclusive, the mechanism is shown as associated with the form of indicating mechanism and dial arrangement illustrated in Figures 1 to 10 inclusive, though it is of course to be understood that the dial arrangement such as illustrated in Figures 11, 12 and 13 may be used. Inasmuch as similar mechanism has already been described, the same numerals are used to designate like parts, and reference is made to the mechanism in said other figures. It will be understood that the mechanism is connected to, and adapted to be operated by, the meter 56 through the shaft 186 as already described.

The indicating and control mechanism is provided with the casing 500 in which the shaft 502 is journaled as at 504 and 506, said shaft corresponding to the shaft 286 and being operatively connected to the pointer 292 disposed in the casing 252. The gear 270 is rotatably mounted with respect to the shaft 502 and is provided with the pivoted pawl 272 adapted to have cooperative relation with the ratchet 274, said ratchet being provided with the gear 276 meshing with the gear 278 provided on the shaft 262 (Figure 6). The gear 278 is provided with the gear 280 meshing with the idler 508 rotatably mounted on the shaft 510, the idler 508 being non-rotatably provided with the idler 512 meshing with the spur gear 514 rotatably mounted on the shaft 502. The spur gear 514 is provided with the bevel gear 516 corresponding to the gear 282. The bevel gear 516 drives the differential pinion 518 pivoted as at 520 on the differential gear and housing 522. The pinion 518 meshes with the bevel gear 524 fixed to the shaft 502 as at 526, said bevel gear 524 being provided with the spur gear 528 meshing with the idler 530 rotatably mounted on the shaft 532. The idler 530 is non-rotatably provided with the idler 534 meshing with the gear 536 provided with the disk 538 corresponding to the disk 298, said disk 538 being provided with a notch adapted to be aligned with the corresponding notch in the disk 540 pinned to the shaft 502 as at 542, said last named disk corresponding to the disk 300.

Pawls are provided, as already described, for the disks 538 and 540, similar to the pawls provided for the disks 298 and 300, and a pawl 304 is provided for the disk 296 in the housing 252. The differential gear 522 meshes with the pinion 544 rotatably mounted on the shaft 510, said pinion meshing with the gear 546 rotatably mounted on the shaft 548, the gear 546 being provided with the Geneva stop member 550. The Geneva stop member 550 is adapted to have cooperative relation with the Geneva stop member 552 non-rotatably mounted on the hub 554, which in turn is non-rotatably mounted on the shaft 556. The shaft 556 is journaled in the casing as at 558 and 560, extending outwardly of the casing and being provided with the setting knob 562.

The interrupted ratchet 564 is secured to the Geneva member 552, being adapted to be engaged by the pawl 566 pivotally mounted adjacent thereto as at 568, being urged toward engagement with the ratchet by means of the spring 570, the ratchet being provided with the oppositely disposed flattened portions 572 and 574 disposed between the sets of ratchet teeth. The shaft 556 is non-rotatably provided with the hub 576 to which the notched disk 578 is secured. The notched disk 578 is provided with the spaced diametrically disposed notches 580 and 582 corresponding to the flattened portions 572 and 574 of the ratchet 564, said disk 578 having the backing disk 584 secured thereto, as well as the coin carrier 586.

The coin carrier 586 is provided with the diametrically disposed coin receiving slots 588 and 590 of suitable configuration for receiving the coin or token 590' adapted to be inserted through the slot 592 in the casing, the slot being of proper configuration for the reception of the particular token. The coin control pawl 594 is pivotally mounted as at 596 adjacent the coin slot 592, said pawl being urged in a counterclockwise direction by means of the spring 598 and being provided with the locking shoulder 600 adapted to be received in the slots 580 or 582. The pawl 594 is provided with the contact lug 602 adapted to be contacted by the coin or token for moving the pawl in a clockwise direction out of the slots 580 or 582. It will be seen that the backing disk 584 guides the pawl as well as retaining the coin between the front housing plate 604 of the casing 500 and the backing disk. The coin chute 606 is provided, normally closed by means of the door 608, the door being provided with the locking lug 610 and 612 engageable in suitable openings provided in the casing 500, the door being retained in locked position by means of the locking shoulder 614 provided on the cam 346, the cam being controlled by the lock 342.

*Operation*

This form of the device of course may be operated by the setting knob 356 in the usual manner. The proper key is inserted in the keyway 344, and turned, the lever 340 being rotated to condition the mechanism operated by the knob 356 for operation. In the event it is desired to obtain a setting through the coin or token, as an initial operation, or as an emergency measure, the token which, in the embodiment shown, is for a fifty gallon delivery, may be inserted in the coin slot 592, being received by the slot 588 of the member 586. It will be seen that the shaft 556 may be rotated by the handle 562, but the amount is determined by the difference in the length of the slot 580 (or 582) and the width of the shoulder 600. Rotation of the shaft in a counterclockwise direction will permit the token to engage the lug 602 to raise the pawl 594 to disengage the shoulder 600 from the slot 580.

Continued rotation of the shaft permits the pawl 566 to engage the ratchet teeth to prevent backing up of the shaft 556, and will cause the Geneva member 616 provided on the member 552 to operate the Geneva member 550, the movement being through one tooth. It will be seen that the Geneva member 618 is diametrically disposed and corresponds to the member 616, being operative when the slot 582 is in the place of the slot 580 as shown in Figure 14. Rotation of the member 550 causes rotation of the gear 546, which rotates the gear 544, which in turn rotates the differential gear 522, causing rotation of said gear through a distance corresponding to five notches on the ratchet 274 which corresponds to 50 gallons. Thus rotation of the gear 522 will cause rotation of the gear 524, and consequently the shaft 502, through a sufficient distance to set the pointer 292 through 50 gallons. It will be seen that a complete rotation of the coin carrier 586 for one coin, that is, rotation through 180° of the shaft 556, will cause the coin to drop from the indentation 588 and be received in the coin chute 606. Thus, when the operator operates the lock 342 to set the device in the usual manner, he can at that time open the door 608 as the cam shoulder 614 will be removed out of locking position, whereupon the token or coin may be extracted.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is—

1. In combination, a meter having a cylinder, a piston mounted for reciprocation in said cylinder, indicating mechanism disposed adjacent said cylinder, an operative connection between said piston and indicating mechanism adjacent one end of said cylinder, and means controlled by the indicating mechanism and engageable with a part movable with the movement of the piston for arresting movement of said piston when said indicating mechanism has reached a predetermined position.

2. In a device of the character described, the combination of an oscillatable shaft, a rotatable shaft disposed adjacent thereto, means between said shafts whereby oscillation of said first named shaft rotates said second named shaft in one direction, an indicator shaft, first index means fixed to said indicator shaft, second index means rotatably mounted on said indicator shaft, operative connection means between said second named shaft and said second index means, operative connecting means between said second and first index means so constructed and arranged that said second index means drives said first index means in a predetermined manner, setting means for selectively setting said index means, locking means controlled by said index means for rendering said first named shaft inoperative when said index means reach predetermined positions, and means for controlling said locking means and said setting means.

3. In a device of the character described, the combination of an oscillatable shaft, a rotatable shaft disposed adjacent thereto, means between said shafts whereby oscillation of said first named shaft rotates said second named shaft in one direction, an indicator shaft, first index means fixed to said indicator shaft, second index means rotatably mounted on said indicator shaft, operative connection means between said second named shaft and said second index means, operative connecting means between said second and first index means so constructed and arranged that said second index means drives said first index means in a predetermined manner, setting means for selectively setting said index means, locking means controlled by said index means for rendering said first named shaft inoperative when said index means reach predetermined positions, and means for permitting said setting means to be selectively connected to said index means and for rendering said locking means inoperative.

4. In a device of the character described, the combination of an oscillatable shaft, a rotatable shaft disposed adjacent thereto, means between said shafts whereby oscillation of said first named shaft rotates said second named shaft in one direction, an indicator shaft, first index means fixed to said indicator shaft, second index means rotatably mounted on said indicator shaft, operative connection means between said first index means and said second shaft, setting means for selectively setting said index means, said index means being so relatively arranged that said second index means can be moved to the same setting as said first index means and said first index means can be reset with respect to said second index means so that the setting of said first index means will show the original setting of said first index means plus the amount of the reset, locking means controlled by said first index means for rendering said first named shaft inoperative when said first index means reaches a predetermined position, and means for controlling said locking means and said setting means.

5. In a device of the character described, the combination of an oscillatable shaft, a rotatable shaft disposed adjacent thereto, means between said shafts whereby oscillation of said first named shaft rotates said second named shaft in one direction, an indicator shaft, first index means fixed to said indicator shaft, second index means rotatably mounted on said indicator shaft, operative connection means between said first index means and said second shaft, setting means for selectively setting said index means, said index means being so relatively arranged that said second index means can be moved to the same setting as said first index means and said first index means can be reset with respect to said second index means so that the setting of said first index means will show the original setting of said first index means plus the amount of the reset, locking means controlled by said first index means for rendering said first named shaft inoperative when said first index means reaches a predetermined position, and means for permitting said setting means to be selectively connected to said index means and for rendering said locking means inoperative.

6. In a device of the character described, the combination of an oscillatable shaft, a rotatable shaft disposed adjacent thereto, means between said shafts whereby oscillation of said first named shaft rotates said second named shaft in one direction, an indicator shaft, first index means fixed to said indicator shaft, second index means rotatably mounted on said indicator shaft, operative connection means between said second named shaft and said second index means, operative connecting means between said second and first index means so constructed and arranged that said second index means drives said first index means in a predetermined manner, said connecting means including a differential, setting means for selectively setting said index means, locking means controlled by said index means for rendering said first named shaft inoperative when said index means reach predetermined positions, means for controlling said locking means and said setting means, and coin control mechanism operative to set said index means in accordance with the coin inserted, said coin control mechanism including a setting shaft, preventing means normally preventing rotation of said setting shaft, coin receiving means for receiving a coin, said coin receiving means being movable when a coin is received therein to cause release of said preventing means for a predetermined rotation of said setting shaft, and operative connections between said setting shaft and said differential whereby a predetermined movement of said setting shaft correspondingly sets one of said indices.

7. In a device of the character described, the combination of an oscillatable shaft, a rotatable shaft disposed adjacent thereto, means between said shafts whereby oscillation of said first named shaft rotates said second named shaft in one direction, an indicator shaft, first index means fixed to said indicator shaft, second index means rotatably mounted on said indicator shaft, operative connection means between said first index means and said second shaft, said connection means including a differential, setting means for selectively setting said index means, said index means being so relatively arranged that said second index means can be moved to the same setting as said first index means and said first index means can be reset with respect to said second index means so that the setting of said first index means will show the original setting of said first index means plus the amount of the reset, locking means controlled by said first index means for rendering said first named shaft inoperative when said first index means reaches a predetermined position, means for controlling said locking means and said setting means, coin control mechanism operative to set said index means in accordance with the coin inserted, said coin control mechanism including a setting shaft, preventing means normally preventing rotation of said setting shaft, coin receiving means for receiving a coin, said coin receiving means being movable when a coin is received therein to cause release of said preventing means for a predetermined rotation of said setting shaft, and operative connections between said setting shaft and said differential whereby a predetermined movement of said setting shaft correspondingly sets one of said indices.

8. In a device of the character described, the combination of an oscillatable shaft, a rotatable shaft disposed adjacent thereto, means between said shafts whereby oscillation of said first named shaft rotates said second named shaft in one direction, an indicator shaft, first index means fixed to said indicator shaft, second index means rotatably mounted on said indicator shaft, operative connection means between said first index means and said second shaft, said connection means including a differential, setting means for selectively setting said index means, said index means being so relatively arranged that said second index means can be moved to the same setting as said first index means and said first index means can be reset with respect to said second index means so that the setting of said first index means will show the original setting of said first index means plus the amount of the reset, locking means controlled by said first index means for rendering said first named shaft inoperative when said first index means reaches a predetermined position, means for permitting said setting means to be selectively connected to said index means and for rendering said locking means inoperative, coin control mechanism operative to set said index means in accordance with the coin inserted, said coin control mechanism including a setting shaft, preventing means normally preventing rotation of said setting shaft, coin receiving means for receiving a coin, said coin receiving means being movable when a coin is received therein to cause release of said preventing means for a predetermined rotation of said setting shaft, and operative connections between said setting shaft and said differential whereby a predetermined movement of said setting shaft correspondingly sets one of said indices.

9. In combination, a meter having a cylinder, a piston mounted for reciprocation in said cylinder, indicating mechanism disposed adjacent said meter, an operative connection between said piston and indicating mechanism adjacent one end of said cylinder, said operative connection including an oscillatable shaft, a rotatable shaft disposed adjacent thereto, means between said shafts whereby oscillation of said first named shaft rotates said second named shaft in one direction, said indicating mechanism including an indicator shaft, first index means associated with said indicator shaft, second index means associated with said indicator shaft, operative connecting means between said second named shaft and said second index means, connecting means between said second and first index means so constructed and arranged that said second index means drives said first index means in a predetermined manner, setting means for selectively setting said index means, and locking means actuated by said index means for rendering said first named shaft inoperative when said index means reach predetermined positions.

10. In combination, a meter having a cylinder, a piston mounted for reciprocation in said cylinder, indicating mechanism disposed adjacent said meter, an operative connection between said piston and indicating mechanism adjacent one end of said cylinder, said operative connection including an oscillatable shaft, a rotatable shaft disposed adjacent thereto, means between said shafts whereby oscillation of said first named shaft rotates said second named shaft in one direction, said indicating mechanism including an indicator shaft, first index means associated with said indicator shaft, second index means associated with said indicator shaft, operative connecting means between said second named shaft and said second index means, connecting means between said second and first index means so constructed and arranged that said second index means drives said first index means in a predetermined manner, setting means for selectively setting said index means, locking means actuated by said index means for rendering said first named shaft inoperative when said index means reach predetermined positions, and means for permitting said setting means to be selectively connected to said index means and for rendering said locking means inoperative.

11. In combination, a meter having a cylinder, a piston mounted for reciprocation in said cylinder, indicating mechanism disposed adjacent said meter, an operative connection between said piston and indicating mechanism adjacent one end of said cylinder, said operative connection including an oscillatable shaft, a rotatable shaft disposed adjacent thereto, means between said shafts whereby oscillation of said first named shaft rotates said second named shaft in one direction, said indicating mechanism including an indicator shaft, first index means associated with said indicator shaft, second index means associated with said indicator shaft, operative connecting means between said first index means and said second shaft, setting means for selectively setting said index means, said index means being so relatively arranged that said second index means can be moved to the same setting as said first index means and said first index means can be reset with respect to said second index means so that the setting of said first index means will show the original setting of said first index means plus the amount of the reset, and locking means actuated by said first index means for rendering said first named shaft inoperative when said first index means reaches a predetermined position.

12. In combination, a meter having a cylinder, a piston mounted for reciprocation in said cylinder, indicating mechanism disposed adjacent said meter, an operative connection between said piston and indicating mechanism adjacent one end of said cylinder, said operative connection including an oscillatable shaft, a rotatable shaft disposed adjacent thereto, means between said shafts whereby oscillation of said first named shaft rotates said second named shaft in one direction, said indicating mechanism including an indicator shaft, first index means associated with said indicator shaft, second index means associated with said indicator shaft, operative connecting means between said first index means and second shaft, setting means for selectively setting said index means, said index means being so relatively arranged that said second index means can be moved to the same setting as said first index means and said first index means can be reset with respect to said second index means so that the setting of said first index means will show the original setting of said first index means plus the amount of the reset, locking means actuated by said first index means for rendering said first named shaft inoperative when said first index means reaches a predetermined position, and means for permitting said setting means to be selectively connected to said index means and for rendering said locking means inoperative.

13. In a device of the character described, the combination of a movable shaft, a rotatable shaft disposed adjacent thereto, means between said shafts whereby said first named shaft rotates said second named shaft, an indicator shaft, first index means associated with said indicator shaft, second index means, operative connection means between said second named shaft and said second index means, operative connecting means between said second and first index means so constructed and arranged that said second index means drives said first index means in a predetermined manner, setting means for selectively setting said index means, and locking means actuated by said index means for rendering said first named shaft inoperative when said index means reach predetermined positions.

14. In a device of the character described, the combination of a movable shaft, a rotatable shaft disposed adjacent thereto, means between said shafts whereby said first named shaft rotates said second named shaft, an indicator shaft, first index means associated with said indicator shaft, second index means, operative connection means between said second named shaft and said second index means, operative connecting means between said second and first index means so constructed and arranged that said second index means drives said first index means in a predetermined manner, setting means for selectively setting said index means, locking means actuated by said index means for rendering said first named shaft inoperative when said index means reach predetermined positions, and means adapted to be manually actuated for rendering said locking means and said setting means inoperative.

15. In a device of the character described, the combination of a movable shaft, a rotatable shaft disposed adjacent thereto, means between said shafts whereby said first named shaft rotates said second named shaft, an indicator shaft, first index means associated with said indicator shaft, second index means, operative connection means between said second named shaft and said second index means, operative connecting means between said second and first index means so constructed and arranged that said second index means drives said first index means in a predetermined manner, setting means for selectively setting said index means, locking means actuated by said index means for rendering said first named shaft inoperative when said index means reach predetermined positions, and means for permitting said setting means to be selectively connected to said index means and for rendering said locking means inoperative.

16. In a device of the character described, the combination of a movable shaft, a rotatable shaft disposed adjacent thereto, means between said shafts whereby said first named shaft rotates said second named shaft, an indicator shaft, first index means movable by said indicator shaft, second index means, operative connection means between said second named shaft and said second index means, setting means for selectively setting said index means, said index means being so relatively arranged that said second index means can be moved to the same setting as said first index means and said first index means can be reset with respect to said second index means so that the setting of said first index means will show the original setting of said first index means plus the amount of the reset, locking means actuated by said first index means for rendering said first named shaft inoperative when said first index means reaches a predetermined position, and means for permitting said setting means to be selectively connected to said index means and for rendering said locking means inoperative.

SHERWOOD HINDS.